United States Patent
Fujisawa et al.

(10) Patent No.: US 7,395,818 B2
(45) Date of Patent: Jul. 8, 2008

(54) MULTI-GASEOUS FUEL CONTROL DEVICE FOR A COMBUSTION ENGINE WITH A CARBURETOR

(75) Inventors: Kazuhito Fujisawa, Natori (JP); Hironari Ikeda, Shibata-Machi (JP); Takashi Horikawa, Natori (JP)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/402,234

(22) Filed: Apr. 11, 2006

(65) Prior Publication Data

US 2006/0236986 A1    Oct. 26, 2006

(30) Foreign Application Priority Data

Apr. 21, 2005 (JP) ............................. 2005-123595
May 25, 2005 (JP) ............................. 2005-152777

(51) Int. Cl.
*F02B 43/00* (2006.01)
*B01F 3/02* (2006.01)

(52) U.S. Cl. ..................... 123/527; 48/180.1; 123/575; 123/463; 123/515

(58) Field of Classification Search ................ 123/456, 123/457, 458, 575, 576, 577, 578, 463, 382, 123/383, 515, 527; 48/180.1
See application file for complete search history.

(56) References Cited

U.S. PATENT DOCUMENTS 2,664,872 A * 1/1954 Ericson et al. ......... 123/179.15
4,306,532 A * 12/1981 Camacho ................. 123/527
4,370,969 A * 2/1983 Zarrelli et al. ............ 123/525
4,492,207 A * 1/1985 Hallberg .................. 123/527
4,594,201 A * 6/1986 Phillips et al. ............ 261/18.3
6,035,837 A * 3/2000 Cohen et al. .............. 123/575

FOREIGN PATENT DOCUMENTS

JP            5-9632        2/1993

* cited by examiner

*Primary Examiner*—Stephen K. Cronin
*Assistant Examiner*—J. Page Hufty
(74) *Attorney, Agent, or Firm*—Reising, Ethington, Barnes, Kisselle, P.C.

(57) ABSTRACT

A fuel control device for a combustion engine capable of running on any one of a plurality of fuels has a fuel selection module with a plurality of fuel type settings for selecting a specific fuel type whereupon the fuel control device controls the outlet pressure of the chosen fuel to a desired fuel pressure corresponding to the calorific properties of the chosen fuel. The fuel selection module preferably operates a plurality of fuel flow circuits each designated for a specific fuel type, and each having a biased closed inlet valve and a biased closed outlet valve. Located preferably between each inlet and outlet valve is a pressure regulator designated for the specific fuel type and controlling the outlet fuel pressure. The device preferably includes a fuel metering apparatus and a shutoff valve that communicate with, and control in part, fuel flow through the fuel flow circuits.

25 Claims, 5 Drawing Sheets

MULTI-GASEOUS FUEL CONTROL DEVICE FOR A COMBUSTION ENGINE WITH A CARBURETOR

RELATED APPLICATIONS

Applicants claim priority of Japanese Application No. 2005-123595, filed on Apr. 21, 2005, and Japanese Application No. 2005-152777, filed on May 25, 2005.

FIELD OF THE INVENTION

The present invention relates to a fuel system and more particularly to a fuel control device for a combustion engine.

BACKGROUND OF THE INVENTION

Internal combustion engines can operate on multiple types of gaseous fuels such as petroleum-based propane gas and butane gas. Unfortunately, propane gas and butane gas have different calorific values and therefore must be provided to the engine at specific pre-determined pressures dependent upon the type of gas. Because specific gasses must flow at specific pressures the ability of an engine to run utilizing a variety of different fuels is somewhat moot because an easy and economical means of varying fuel supply pressures to correspond to different gas types is not available.

SUMMARY OF THE INVENTION

A fuel control device for a combustion engine, that is capable of running on any one of a plurality of fuels, has a fuel selection module with a plurality of fuel type settings for selecting a specific fuel type. The fuel control device controls the outlet pressure of a chosen fuel to a fuel pressure that generally corresponds to the calorific properties of the chosen fuel, preferably in a gaseous state. The fuel selection module preferably operates a plurality of fuel flow circuits for each fuel-type setting each having a biased closed inlet valve supported by an inlet valve bank and a biased closed outlet valve supported by an outlet valve bank. Preferably, the fuel selection module includes a single rotating camshaft having a plurality of cams with each cam associated with a specific one of the plurality of fuel flow circuits. Each flow circuit includes a pair of pushrods or followers that are selectively activated by the respective cam to simultaneously open respective inlet and outlet valves. Located preferably between each inlet and outlet valve is a pressure regulator unit or jet designated for the specific fuel type and controlling the outlet fuel flow pressure.

Located preferably between the pressure regulating units and the inlet valves is a fuel metering apparatus having a shutoff valve for preventing fuel flow after the fuel-type is chosen by an operator but before the engine is started and a flow valve adapted to operate relative to a fuel metering chamber for controlling the amount of fuel flowing through the outlet valve bank. Actuators of the flow and shutoff valves of the fuel metering apparatus are preferably of a diaphragm-type and generally open the valves upon specific pressure signals produced by the starting and/or running engine allowing for a relatively compact fuel metering apparatus design. Preferably, the biased closed flow valve opens upon a sufficient vacuum or decrease in pressure sensed from a venturi region of a mixing passage of a carburetor upstream from a throttle valve. The shutoff valve is preferably biased closed and opens upon a vacuum or decrease in pressure sensed from the mixing passage downstream of the throttle valve.

In one implementation, the shutoff valve of the fuel metering apparatus and the associated valve actuator preferably operate along a common centerline. Unlike known pressure regulators or fuel metering apparatuses, the fuel flowing through the open shutoff valve of the fuel metering apparatus is not exposed directly to the actuator vacuum and thus is not restricted to a pressure needed to open the valve. The shutoff valve is preferably of a poppet-type having a valve stem that moves along the centerline when an elongated member of the actuator moves along the same centerline and pushes upon the valve stem to move a head of the valve away from a valve seat. The elongated member of the actuator connects to a large diaphragm located between a reference chamber and a vacuum chamber communicating with the mixing passage and a smaller diaphragm near the shutoff valve. The smaller diaphragm generally divides a displacement chamber that communicates with the vacuum pressure of the vacuum chamber and a valve cavity through which the selected fuel type flows downstream of the valve seat. The elongated member of the actuator is displaced linearly toward the valve stem by a force equated from the difference between the vacuum exposed surfaces of the large and smaller diaphragms.

Because in this implementation the shutoff valve and pressure of the fuel flowing therethrough is independent of the needed operational pressures of the valve actuator and because the elongated member of the actuator moves linearly in the direction of the diaphragm movement, the only relative forces are linear adding to stability of the valve actuation and durability of the diaphragm.

Moreover, since the vacuum diaphragm is provided externally of the fuel metering chamber associated with the actuator of the flow valve, freedom in layout design can be improved and the size of the vacuum diaphragm can be selected at will without regard to the size of the fuel metering chamber. Therefore, even when the vacuum pressure is small, a relatively large force can be produced, and this expands the range of the control of the shutoff valve. For instance, the shutoff valve can be opened even while the vacuum pressure is relatively small. Whereas, if the vacuum diaphragm of the shutoff valve actuator is provided in the metering chamber of the flow valve actuator, an increase in the size of the vacuum diaphragm necessarily increases the overall size of the fuel metering apparatus.

Other advantages of the present invention include a fuel control device that facilitates selection of fuel-types, can be mounted to an engine capable of running on any one of a plurality of fuels, and a fuel metering apparatus that is easily adapted to different specifications so as to meet the needs of different engines while utilizing an identical structure. Other advantages include a robust shutoff valve actuator that is generally free of air leakage concerns about the elongated member, and a device that automatically shuts off fuel flow when the engine is stopped thereby conserving fuel, a device that is simple in design and inexpensive enough to warrant use on small engine applications, and in service has a long and useful life. Of course, other advantages may be realized and devices incorporating the present invention may achieve some, all, or none of these advantages.

BRIEF DESCRIPTION OF THE DRAWINGS

These and other objects, features and advantages of the invention will become apparent from the following detailed description of preferred embodiments and best mode, appended claims, and accompanying drawings in which:

DETAILED DESCRIPTION OF PREFERRED EMBODIMENTS

Figure 1:
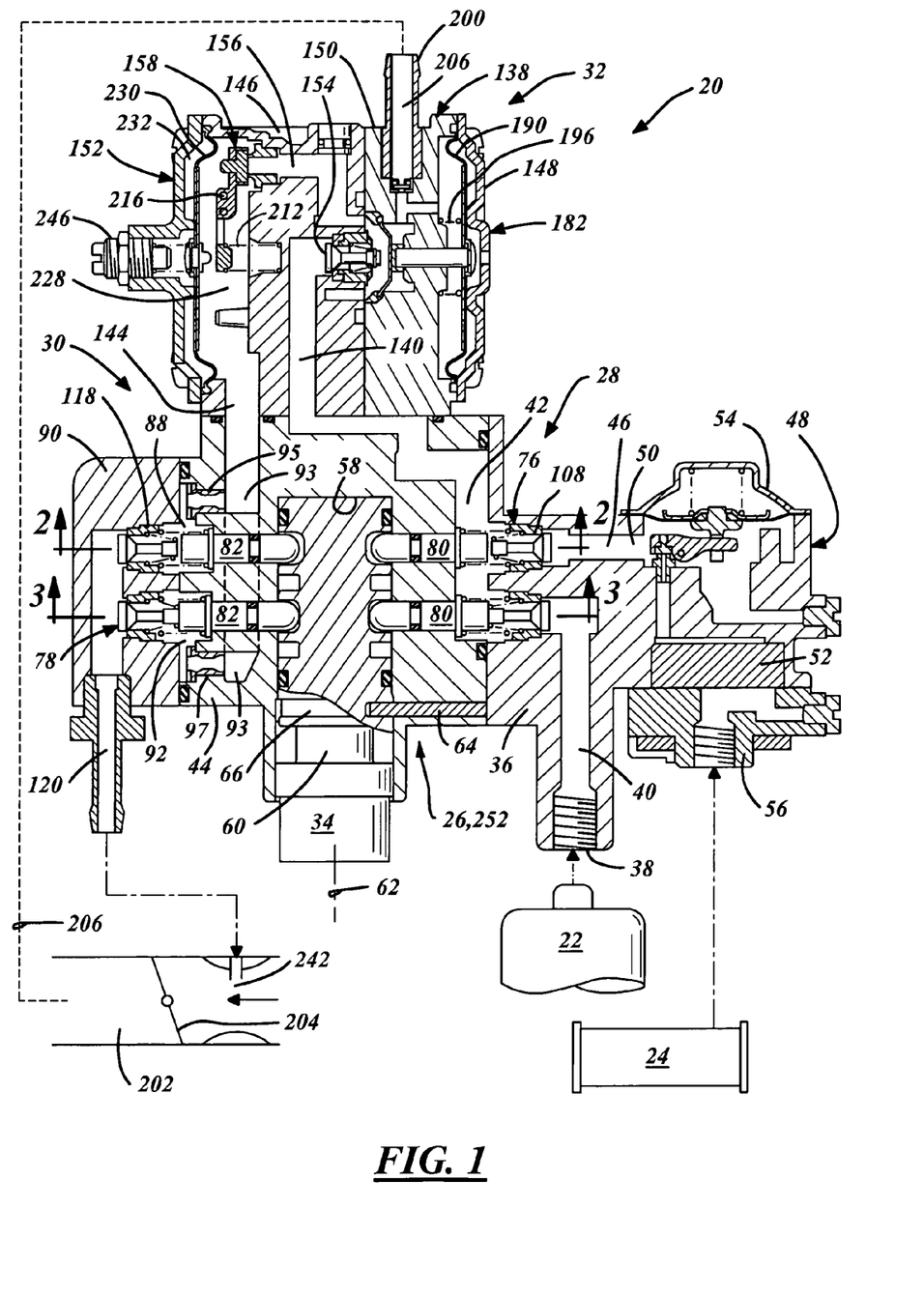
FIG. 1 is a cross section of a fuel control device embodying the present invention having a fuel metering apparatus shown closed and a fuel selection module shown in an all-closed position.

As best illustrated in FIG. 1, a fuel control device 20 supplies any selected one of a plurality of preferably petroleum-based fuels to a multi-fuel compatible combustion engine. As illustrated, the number of different fuels are preferably two (although more than two may be used) which are preferably butane and propane, which may be stored in a pressurized liquid state and expand into a gaseous state generally when flowing into the device 20 from a propane storage cylinder or source 22 and a butane storage cylinder or source 24. Although the multiple gaseous fuels are illustrated as propane and butane gas, the present invention is not limited to this example and may be adapted to handle any number or variety of gaseous fuels including but not limited to natural gas.

The fuel control device 20 is generally modularized, having a centralized fuel selection module 26 located between an inlet valve bank 28 and an interacting outlet valve bank 30. A fuel metering apparatus 32 is in gaseous communication with and is preferably attached sealably to a side of the fuel selection module 26 spanning between the valve banks 28, 30. Preferably, a control knob 34 projects through a fourth side of the fuel selection module 26 located opposite to the side supporting the metering apparatus 32.

A support body 36 of the inlet valve bank 28 carries a propane inlet port 38 that generally communicates with and preferably threads to the propane storage cylinder 22 via a suitable tubular or pipe fittings. A propane inlet passage 40 in the support body 36 communicates between the inlet port 38 and an intake manifold 42 generally defined between the support body 36 of the inlet valve bank 28 and a centralized main body 44 of the fuel selection module 26. Similarly, a butane inlet passage 46 extends through the support body 36 and intermittently communicates between the intake manifold 42 and preferably a butane conditioning module 48 that receives butane fuel from the butane storage cylinder 24 at an inlet port 50 of the module 26, is heated as the butane flows through a heating element 52 and pressure controlled at a butane gas pressure regulator 54 of the module 26 typically known in the art. Preferably, the inlet port 50 is threaded for receipt of external butane cylinder fittings and is carried by a heater cover 56 that when removed from the conditioning module 48 exposes the heating element 52 for repair and/or replacement. One skilled in the art would now know that the butane conditioning module 48 can be remotely located away from the fuel switching and pressure regulating device 20 or may not be required at all if butane fuel is not one of the plurality of fuels controlled by device 20.

As best illustrated in FIGS. 1-4, a blind bore 58 in the main body 44 of the fuel selection module 26 receives a camshaft 60 that rotates about axis 62 and projects outward to a distal end terminating at the control knob 34. Preferably, the camshaft 60 is held axially in the blind bore 58 by a retaining pin 64 fixed to the main body 44 and projecting into a circumferential, continuous groove 66 in the camshaft 60. As illustrated, the camshaft 60 carries two preferably recessed cams described as a butane cam 68 (FIG. 2) and a propane cam 70 (FIG. 3) for opening and closing respective flow circuits 72, 74 each having a biased closed inlet valve 76 and a generally redundant and biased closed outlet valve 78. The axial cross section of the butane cam 68 is preferably generally S-shaped (see FIG. 2) and the axial cross section of the propane cam 70 is generally a mirror image or Z-shaped (see FIG. 3). Both shapes are substantially symmetric about the axis 62. Alternatively, one skilled in the art would now know that the cams 68, 70 could be more than two, thus controlling more than two flow circuits. Furthermore, one skilled in the art would now know that the cams need not be radially recessed but can, for example, be lobes that project radially outward from the shaft 60, and the cross sections could both be S-shaped or otherwise contoured or shaped, for instance restricting rotation of knob 34 in the counter-clockwise direction or vise-versa.

Figure 2:
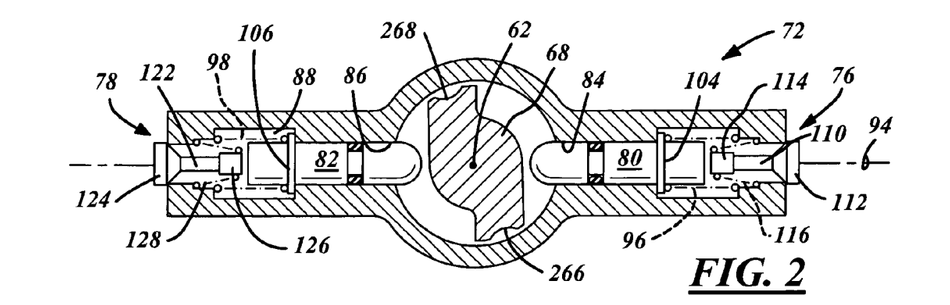
FIG. 2 is a cross section of a first or upper fuel circuit of the selection module shown closed and taken along line 2-2 of FIG. 1.
Figure 3:
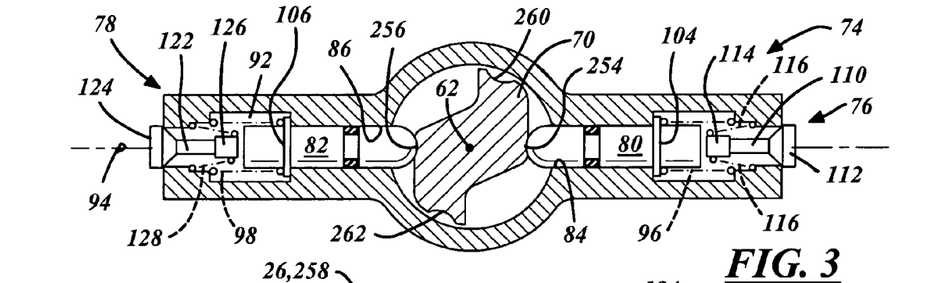
FIG. 3 is a cross section of a second or lower fuel circuit of the selection module shown closed and taken along line 3-3 of FIG. 2.
Figure 4:
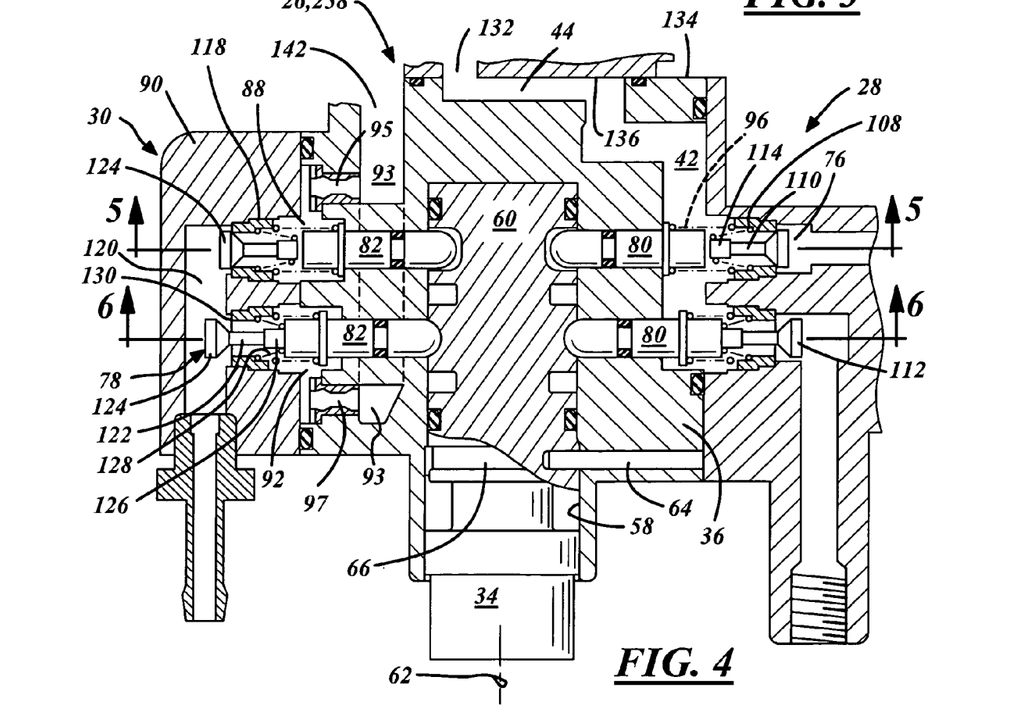
FIG. 4 is a partial cross section of the fuel control device similar in perspective to FIG. 1 and illustrating the first fuel circuit closed and the second fuel circuit open when the selection module is in a first selected gas position.

As best illustrated in FIGS. 2-4, each flow circuit 72, 74 has an inlet push rod 80 associated with the inlet valve 76 and an outlet push rod 82 associated with the outlet valve 78. The push rods 80, 82 are preferably opposed diametrically to one another with respect to axis 62 and are supported axially slidably in respective inlet and outlet through-bores 84, 86 in the main body 44 of the fuel selection module 26. The inlet though-bores 84 extend and communicate between the blind bore 58 and the intake manifold 42 defined preferably by the main body 44 and a body 36 of the inlet valve bank 28. Similarly, the outlet through-bore 86 associated with the butane flow circuit 72 extends and communicates between the blind bore 58 and a butane cavity 88 defined between the main body 44 of the fuel selection module 26 and a support body 90 of the outlet valve bank 30. The outlet through-bore 86 associated with the propane flow circuit 74 extends and communicates between the blind bore 57 and a propane cavity 92 defined between the main body 44 of the fuel selection module 26 and the support body 90 of the outlet valve bank 30.

The inlet and outlet push rods 80, 82 preferably reciprocate along a common centerline 94 concentric to the through-bores 84, 86 and substantially perpendicular to axis 62. Each rod 80, 82 of each flow circuit 72, 74 when open (see FIGS. 4 and 6-8) is biased against the butane and propane cams 68, 70 at rounded radial inward ends 99, 101 by respective compression springs 96, 98 coiled about the opposite radially outward ends 100, 102 of the respective push rods 80, 82. Preferably, the spring 96 associated with the inlet push rod 80 is compressed axially between a circumferentially extending and radially projecting collar 104 of push rod 80 and the body 36 of the inlet valve bank 28. The outward end 100, the spring 96 and the collar 104 are generally located in the intake manifold 42. Similarly, the spring 98 associated with the outlet push rod 82 is compressed axially with respect to centerline 94 between a circumferentially extending and radially projecting collar 106 of push rod 82 and the body 90 of the outlet valve bank 30. The outward ends 102, the springs 98 and the collars 106 are generally located in the respective cavities 88, 92.

Figure 10:
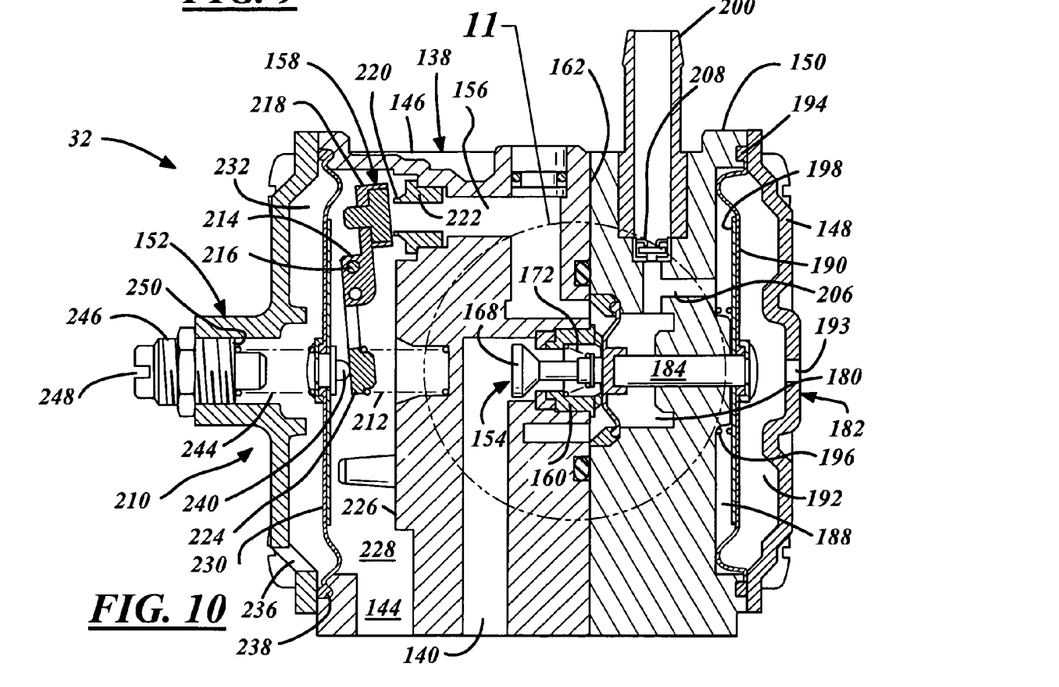
FIG. 10 is an enlarged cross section of the fuel metering apparatus shown open and similar in perspective to FIG. 1.

Pressure regulating units or jets 95, 97 permit a desired fuel supply pressure to be achieved and provided into respective cavities 88, 92 from a common distribution chamber 93 in the main body 44. The pressure regulating units 95, 97 are preferable fuel jets press fitted or fixed into bores defined by the main body 44. The butane and propane jets 95, 97 preferably are manufactured with equal outer diameters but have varying inner diameters dependent upon the type of gaseous fuel they will flow. As best shown in FIGS. 1 and 10, the distribution chamber 93 receives the flow of gaseous fuel from the metering apparatus 32, which meters fuel flow and in-part controls fuel pressure regardless of fuel type. The metering apparatus 32 communicates with and receives fuel flow from the upstream intake manifold 42. Because the gaseous fuel pressure at the inlet side of the butane and propane jets 95, 97 is known and held substantially constant by the metering apparatus 32, the inner diameters of the respective jets 95, 97 are sized to obtain the desired fuel pressures at a given flow rate for the respective gases at an outlet passage 120 of the fuel control device 20 in the outlet valve bank 30. Although fuel jets are an efficient and economical way to control fuel pressure, one skilled in the art would now know that other types of pressure regulating units can be exchanged with the fuel jets including, for example, more complex units typically incorporating biasing springs and/or resilient diaphragms.

The biased closed inlet valves 76 of the butane and propane flow circuits 72, 74 are preferably poppet valves and have peripheral housings or sleeves 108 (see FIGS. 4 and 7) that press fit or thread into outlets of the respective butane and propane inlet passages 46, 40. A valve stem 110 of each valve carries an enlarged head 112 at a leading end and an enlarged abutment or heel 114 at the opposite trailing end along the centerline 94. A semi-conical compression spring 116 is located concentrically about the associated centerline 94 and compressed axially between an annular surface carried by the sleeve 108 and the enlarged abutment 114 for biasing the valve head 112 sealably against an annular valve seat 130 carried by the sleeve 108 and substantially facing upstream into the passages 46, 40. The spring 116 and abutment 114 of valve stem 110 are generally exposed in the intake manifold 42.

Similarly, the biased closed outlet valves 78 of the butane and propane flow circuits 72, 74 are preferably poppet valves and have peripheral housings or sleeves 118 that press fit or thread into inlet ports of the common outlet passage 120 of the outlet valve bank 30 in the support body 90. As best shown in FIGS. 2-3 and 5-6, a valve stem 122 of each outlet valve 78 carries an enlarged head 124 at one end and an enlarged abutment or heel 126 at the opposite end. A semi-conical compression spring 128 is located concentrically about the associated centerline 94 and compressed axially between an annular surface carried by the sleeve 118 and the enlarged abutment 126 for biasing the valve head 124 sealably against an annular valve seat 130 carried by the sleeve 118 and substantially facing downstream into the outlet passage 120 (see FIG. 7). The spring 128 and abutment 126 of valve stem 122 or respective butane and propane flow circuits 72, 74 are generally exposed in respective butane and propane cavities 88, 92. The enlarged abutments 114, 126 of the respective inlet and outlet valves 76, 78 co-axially confront the radially outward ends 100, 102 of the inlet and outlet push rods 80, 82.

As best illustrated in FIG. 1, the intake manifold 42 communicates with an inlet channel 140 in a support body 138 of the metering apparatus 32. The distribution chamber 93 receives gaseous fuel at a prescribed pressure and generally regardless of fuel type from an outlet channel 144 in the support body 138.

As best illustrated in FIGS. 1 and 10, the support body 138 includes a base portion 146 that also includes a cover 148, a middle plate 150, and a cap 152. The middle plate 150 is sealably carried between the cover 148 and the base portion 146, and the base portion 146 is disposed between the middle plate 150 and the cap 152. The base portion 146 supports an upstream, diaphragm-operated, shutoff valve 154 of the metering apparatus 32 orientated operatively between the inlet channel 140 and a mid channel 156 in the base portion 146 and supports a downstream, diaphragm-operated, flow valve 158 biased closed and orientated operatively between the mid channel 156 and the outlet channel 144.

Figure 11:
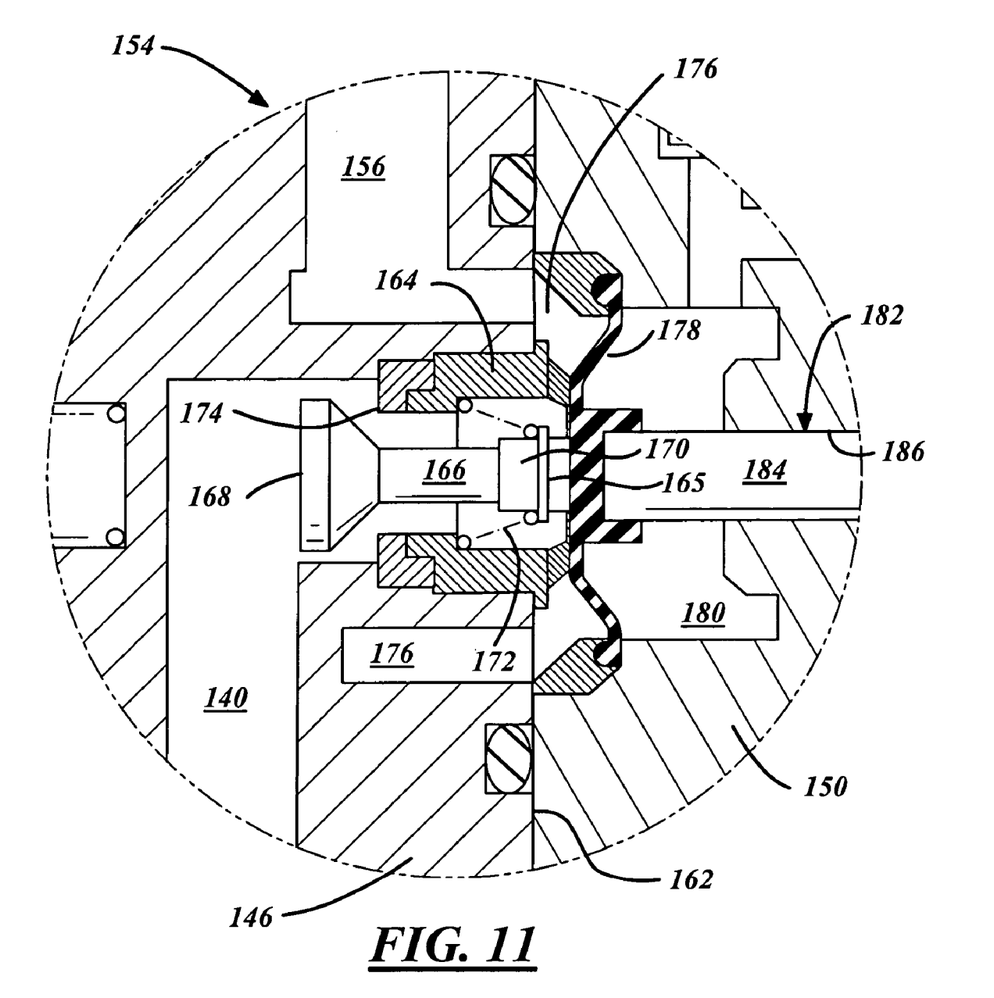
FIG. 11 is an enlarged cross section of a shutoff valve of the fuel metering apparatus shown open and taken from circle 11 of FIG. 10.

As best illustrated in FIGS. 10 and 11, the shutoff valve 154 is preferably a poppet valve actuated by a vacuum pressure from an operating combustion engine, and similar in design to the inlet and outlet valves 76, 78. The shutoff valve 154 is preferably an insert 160 fitted into an outlet end or counter bore of the inlet channel 140 through a first side 162 of the base portion 146. Preferably, the insert 160 includes a cylindrical spring retainer 164 and a valve seat 174 press-fit to the retainer 164. The valve seat 174 and retainer 164 surround or encircle a valve stem 166. The valve stem 166 extends axially and carries an enlarged head 168 at a leading end and an enlarged abutment or heel 170 at a trailing opposite end. A semi-conical or frustum-shaped compression spring 172 is located concentrically about the valve stem 166 and compressed axially with respect to the centerline between an annular ledge preferably carried by the spring retainer 164 and a spring clip 165 engaged to the heel 170 for biasing the valve head 168 sealably against the valve seat 174. One skilled in the art would now know that other alternatives exist to hold an insert 160 carrying a valve seat 174 firmly to the base portion 146 of the support body. For instance, the insert 160 could be engaged threadably to the base portion 146 or if orientation and machining techniques permit, the annular seat 174 could be machined directly to the base portion 146.

The heel 170 of the shutoff valve 154 communicates with a chamber 176 that communicates directly downstream with the mid channel 156 and is generally defined between a gas side of a resiliently flexible diaphragm 178 sealed along a periphery to the middle plate 150 of the support body 138, and the first side 162 of the base portion 146 of the body 138. A displacement chamber 180 is defined between an opposite vacuum side of the diaphragm 178 and the middle plate 150.

An actuator 182 of the shutoff valve 154 opens the shutoff valve 154 preferably upon receiving a sufficient vacuum pressure from a starting or running combustion engine. The actuator 182 preferably has reciprocating rod or member 184 located and supported slidably in a bore 186 in the supplemental portion 150. A first end of the member 184 is generally located in the middle plate 180 and is attached to a central portion of the diaphragm 178. The rod 84 is connected at its other end to a resilient diaphragm 190 that defines a vacuum or pressure chamber 188 on one side and a reference chamber 192 on the other side. The reference chamber may communicate with the atmosphere through a vent 193. Because the actuator 182 must produce a sufficient axial force to open the shutoff valve 154 against the resilient compressive force of spring 172, the diameter or size of diaphragm 190 preferably is substantially larger than that of the diaphragm 178.

A peripheral edge 194 of the diaphragm 190 is sealed continuously between the middle plate 150 and the cover 148. A compression return spring 196 is disposed in the pressure chamber 194 for compression between the middle plate 150 and a reinforcement plate 198 generally carried by the diaphragm 190. The cover 148 further has an inward projecting stop that opposes or confronts the diaphragm 190 in the reference chamber 192 to define the maximum displacement of the diaphragm 190 under the biasing force of the return spring 196.

Preferably, the middle plate 150 supports a barbed nipple 200 that generally communicates with a fuel-and-air mixing passage 202 of a carburetor downstream of a throttle valve 204 (see FIG. 1) and a vacuum channel 206 in the supplemental portion 150 that tees-off to communicate with both the displacement chamber 180 and the pressure chamber 188 (see FIG. 10). One skilled in the art would now know that alternatively to the carburetor, the nozzle 200 and thus vacuum chamber 184 could communicate with an intake manifold of the engine, or a crankcase of a two-stroke engine.

For two-stroke engine applications which produce positive pressure pulses or blow-back from the engine, a check valve 208 (FIG. 10) preferably is located at the inlet of the vacuum channel 206 and preferably is supported by the middle plate 150 adjacent to the nozzle 200. The check valve 208 opens when the pressure in the displacement chamber 180 and pressure chamber 188 are greater than in the nipple 200, and closes when this condition does not exist or a positive pressure impulse is received from the two-stroke engine. For four-stroke engine applications, the check valve 208 can be omitted since such engines provide a stable negative pressure signal.

As best illustrated in FIGS. 1 and 10, the flow valve 158 of the metering apparatus 32 located downstream of and communicating with the shutoff valve 154 via the mid channel 156 is preferably actuated or opened by a diaphragm-type actuator 210 and biased closed by a compression spring 212. An elongated lever or arm 214 of the flow valve 158 connects pivotally to a pin 216 fixed to the base portion 146 of the support body 138. When the valve 158 is biased closed, a valve head 218 fixed to one end of the lever 214 releasably seats against an annular valve seat 220 carried by a cylindrical, flanged, ring 222 press fitted into a counter bore of the mid channel 156 (see FIG. 10). An opposite end 224 of the lever 214 is located substantially diametrically opposite the valve head 218 with respect to the center pin 216 and is biased away from an external side 226 of the base portion 146 by the biasing force of the spring 212 compressed axially between the end 224 and the external side 226. Preferably, the external side 226 of the body portion 146 generally faces in an opposite direction with respect to the face or side 162 of the body portion 146.

The spring 212, the lever 214, the pin 216 and the valve head 218 are located in a control or fuel metering chamber 228 of the actuator 210 communicating between the mid channel 156 and the outlet channel 144 of the metering apparatus 32. The metering chamber 228 is generally defined between the external side 226 of the base portion 146 and a gaseous side of a resiliently flexible diaphragm 230. A reference or atmospheric chamber 232 of the actuator 210 is defined generally between an opposite or dry side of the metering diaphragm 230 and the cap 152. A breathing hole 236 in the cap 152 communicates the reference chamber 232 with the outside environment and a peripheral edge 238 of the metering diaphragm 230 is compressed sealably between the base portion 146 and the cap 152.

The metering diaphragm 230 of the flow valve actuator 210 carries a centrally positioned projection 240 located in the metering chamber 228 that confronts and is preferably spaced from the end 224 of the lever 214 when the flow valve 158 is closed and the actuator 210 is in a rest position (see FIG. 1). When the control chamber 228 is communicated with a vacuum pressure preferably from a venturi region 242 of the carburetor, operation of the actuator 210 is initiated and the diaphragm 230 flexes toward the lever 214 against the biasing force of a return spring 244 located in the reference chamber 232 and engaged under tension between the lid structure 234 and the dry side of the diaphragm 230. Continued flexing of the diaphragm 230 upon sufficient vacuum pressure in the control chamber 228 causes the projection 240 to push upon the end 224 of lever 214 against the compressive force of the spring 212 to open the flow valve 158 (see FIG. 10).

As a fuel flow adjustment feature, the cap 152 of the fuel metering device 32 preferably carries a threaded cylindrical member or screw 246. An external end of the screw 246 has a diametrically extending slot or recess 248 for receipt of a screwdriver or tool. An opposite end of the screw 246 is located in the reference chamber and has a surface 250 that engages the return spring 244. During adjustment, rotation of the screw 246 toward the diaphragm 230 relieves a portion of the tensile force produced by the return spring 244, thus less vacuum is required in the metering chamber 228 to open the flow valve 158. Movement of the screw 246 away from the diaphragm 230 increases the spring force on the diaphragm 230 so a greater magnitude pressure signal is required to open the valve 158.

As best illustrated in FIGS. 1-3, when the combustion engine is shutdown, the operator rotates knob 34 to place the fuel selection module 26 in an all-closed position 252 so that gaseous fuel does not leak through the carburetor and engine. When in the all-closed position 252, the inlet and outlet push rods 80, 82 of the butane flow circuit 72 fully project into the blind bore 58 by the biasing force of the respective springs 96, 98, and are preferably radially spaced with respect to axis 62 from the cam 68 and spaced axially with respect to centerline 94 or from the respective heels 114, 126 of the inlet and outlet valves 76, 78 of the butane flow circuit 72. Axial spacing of the rods 80, 82 from the heels 114, 126 permits the biasing force of the valve springs 116, 128 to seat the respective valve heads 112, 124 sealably against the valve seats 130. Similar to the butane flow circuit 72, the inlet and outlet pushrods 80, 82 of the propane flow circuit 74 are axially spaced from the respective heels 114, 126 of the inlet and outlet valves 76, 78. Unlike the butane flow circuit 72, the inlet and outlet pushrods 80, 82 of the propane flow circuit 74 are not radially spaced from the propane cam 70 of the camshaft 60. Instead, the pushrods 80, 82 are slightly biased against the propane cam 70 in respective and diametrically opposed intermediate recesses 254, 256 carried by the propane cam 70. Placement of the propane pushrods 80, 82 into the respective recesses 254, 256 provides a positive indication to the operator that the fuel selection module 26 is in the all-closed position 252.

Also with the engine not running, the vacuum pressure required to open the shutoff valve 154 and the flow valve 158 of the fuel metering apparatus 32 is not present, hence, the valves 154, 158 are biased closed by respective springs 172, 212. Primarily, closure of shutoff valve 154, and to a lesser degree closure of flow valve 158, act as a backup to further assure gaseous fuel does not leak into the engine during engine shutdown conditions.

Figure 5:
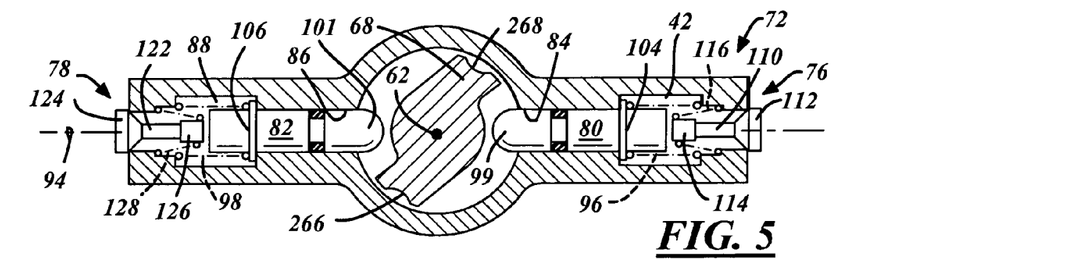
FIG. 5 is a cross section of the first fuel circuit being closed and taken along line 5-5 of FIG. 4.
Figure 6:
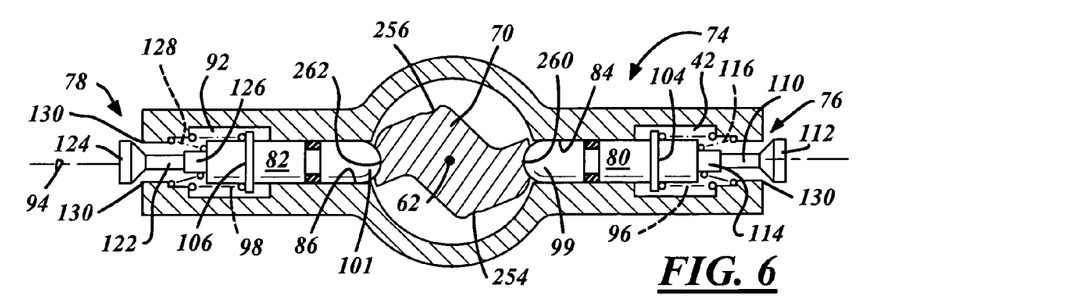
FIG. 6 is a cross section of the second fuel circuit being open and taken along line 6-6 of FIG. 4.

As best illustrated in FIGS. 4-6, when operating the engine with propane gas, the operator first rotates the knob 34 of the camshaft 60 by about ninety rotational degrees in a clockwise direction. This places the fuel selection module 26 in a propane flow position 258 prior to starting the engine. When rotating toward the propane flow position 258, the general Z-shape of the propane cam 70 causes the inlet and outlet pushrods 80, 82 of the propane flow circuit 74 to ride radially against the propane cam 70 and out of the respective intermediate recesses 254, 256. Continued rotation in the clockwise direction moves the pushrods 80, 82 linearly and radially outward against the biasing force of the respective springs 96, 98, and when the pushrods 80, 82 abut the valve heels 114, 116, then also against the biasing force of the respective inlet and outlet valve springs 116, 128. The camshaft 60 rotates until the pushrods 80, 82 slip into diametrically opposed recesses 260, 262 opened radially outward in the propane cam 70. Placement of the propane pushrods 80, 82 into the respective recesses 260, 262 provides a positive indication to the operator that the fuel selection module 26 is in the propane flow position 258.

When rotated into the propane flow position 258, the butane cam 68 of the camshaft 60 has simultaneously rotated with the propane cam 70, however, the S-shape of the butane cam 68 maintains a radial and circumferential space between the corresponding inlet and outlet pushrods 80, 82 thus the respective inlet and outlet valves 76, 78 of the butane flow circuit 72 remain spring-biased closed as previously described. Moreover, because the engine is not yet started, the fuel metering apparatus 32, located between the intake manifold 42 and the outlet passage 120, remains closed and propane does not yet flow through the fuel control device 20 (see FIG. 1).

When the combustion engine is started, the vacuum chamber 188 and the displacement chamber 180 of the shutoff valve actuator 182 receive a vacuum signal via the vacuum channel 206 and preferably from the mixing passage 202 of the carburetor downstream from the throttle valve 204. A force generally equal to the vacuum pressure times the difference between the exposed areas of the diaphragm 190 and the diaphragm 178 overcomes the biasing force of the actuator spring 196 and moves the diaphragm 190 toward the middle plate 150 (see FIG. 10). Because the member 184 is connected between the diaphragms 178 and 190, the diaphragm 190 also displaces the member 184 and the diaphragm 178 until the member 184 or diaphragm 178 engages the heel 170 and opens the shutoff valve 154 against the combined biasing force of the valve spring 172 and the actuator spring 196.

With the shutoff valve 154 open, propane gas flows through the propane inlet passage 40 from the propane cylinder 22, past the open propane inlet valve 74, through the intake manifold 42, the inlet channel 140 of the fuel metering apparatus 32, past the open shutoff valve 154 and generally to the mid channel 156. As the shutoff valve actuator 182 receives the vacuum pressure from downstream of the throttle valve 204, the flow valve actuator 210 of the fuel metering apparatus 32 receives a substantially smaller vacuum pressure from the venturi region 242 of the mixing passage 202 upstream of the substantially or nearly closed throttle valve 204 and during engine starting. This smaller vacuum pressure during engine start is transmitted through the outlet passage 120 of the outlet valve bank 30, then through the open propane outlet valve 78, through the propane cavity 92, the propane jet 97, the distribution chamber 93, and then through the outlet channel 144 of the fuel metering apparatus 32 that communicates directly with the metering chamber 228 of the flow valve actuator 210. The vacuum pressure from the carburetor venturi region 242 creates a force acting on the diaphragm 230 and tending to flex the diaphragm toward the lever 214.

With sufficient vacuum, the diaphragm 230 moves until the projection 240 of the diaphragm pushes against the end 224 of the lever 214 and against the added compressive force of valve spring 212 and generally minus any force produced by the propane pressure against the confronting valve head 218. Movement of the end 224 of the lever 214 moves the head 218 away from the valve seat 220 opening the flow valve 158 until a sufficient increase in pressure in the metering chamber 228 causes the valve to close. When open as in FIG. 10, the propane gas flows through the metering chamber 228, the outlet channel 144 and the distribution chamber 93. From chamber 93 and as illustrated in FIG. 4, the propane gas flows through the propane jet 97 sized to cause a prescribed pressure drop placing the propane gas at a desired pressure for running the engine specifically on propane. The propane gas at the prescribed pressure flows past the open propane outlet valve 78, through the outlet passage 120 and into the venturi region 242 of the carburetor.

After the engine has started, and the throttle valve 204 moves toward a wide open throttle position, the vacuum at the venturi region 242 increases causing preferably a greater deflection of the diaphragm 230 and preferably at a greater frequency. This causes the head 218 of the flow valve 158 to move further from the valve seat 220 and generally more often thus increasing propane gas flow to coincide with the increase in quantity of air flow resulting in a substantially consistent fuel-to-air mixture ratio supplied to the running engine.

Figure 7:
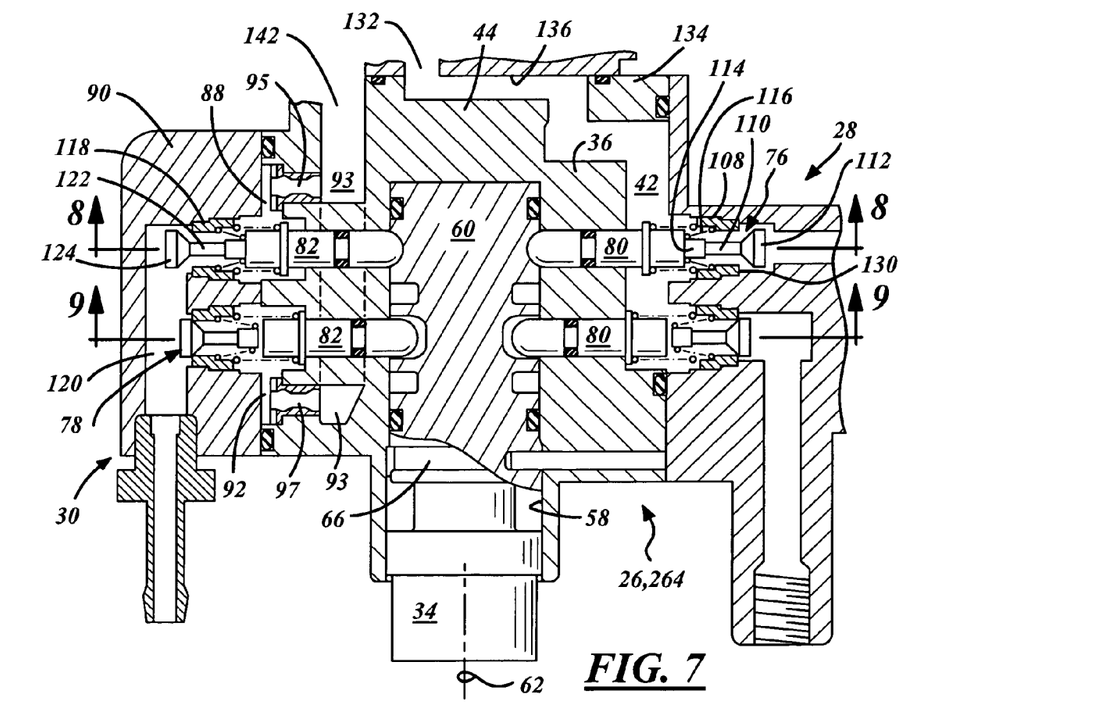
FIG. 7 is a partial cross section of the fuel control device similar in perspective to FIG. 1 and illustrating the first fuel circuit of the fuel switching device open and the second fuel circuit closed when the selection module is in a second selected gas position.
Figure 8:
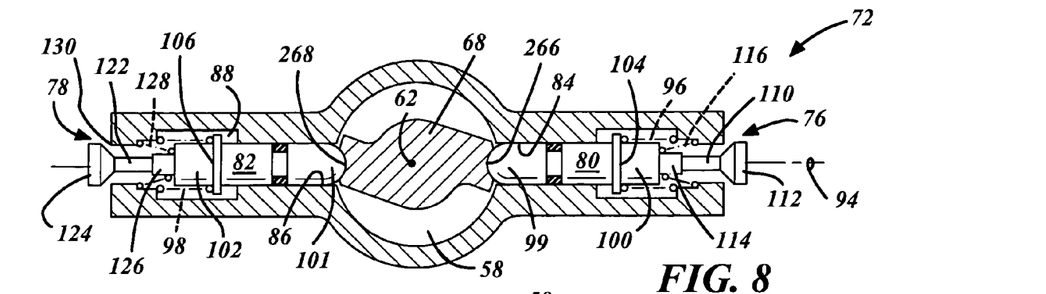
FIG. 8 is a cross section of the first fuel circuit being open and taken along line 8-8 of FIG. 7.
Figure 9:
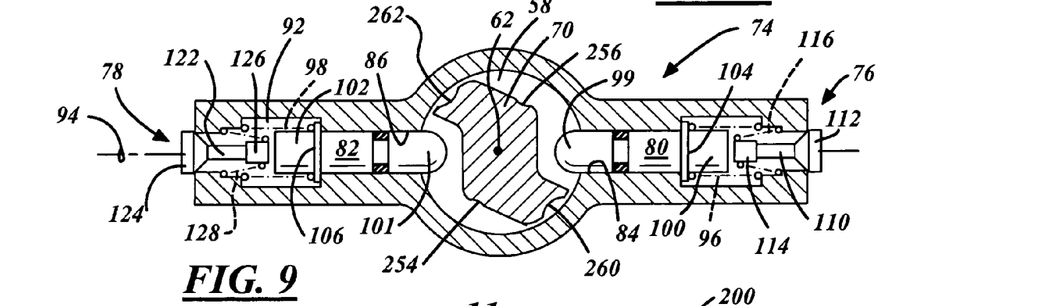
FIG. 9 is a cross section of the second fuel circuit being closed and taken along line 9-9 of FIG. 7.

As best illustrated in FIGS. 7-9, when operating the engine with butane gas, the operator first rotates the knob 34 of the camshaft 60 by about ninety rotational degrees in a counterclockwise direction. This places the fuel selection module 26 in a butane flow position 264 prior to starting the engine. When rotating toward the butane flow position 264, the general S-shape of the butane cam 68 causes the inlet and outlet pushrods 80, 82 of the butane flow circuit 72 to ride radially against the rotating butane cam 68 and the pushrods 80, 82 of the propane flow circuit 74 to ride out of the respective intermediate recesses 254, 256. Continued rotation in the counterclockwise direction moves the pushrods 80, 82 of the butane flow circuit 72 linearly and radially outward against the biasing force of the respective rod springs 96, 98 and when the pushrods 80, 82 abut the valve heels 114, 116, then also against the biasing force of the respective inlet and outlet valve springs 116, 128 of the butane flow circuit 72 (see FIG. 8). The camshaft 60 rotates until the pushrods 80, 82 slip into diametrically opposed butane recesses 266, 268 opened radially outward in the butane cam 68. Placement of the butane pushrods 80, 82 into the respective recesses 266, 268 provides a positive indication to the operator that the fuel selection module 26 is in the butane flow position 264.

When rotated into the butane flow position 264, the propane cam 70 of the camshaft 60 has simultaneously rotated with the butane cam 68, however, the Z-shape of the propane cam 70 creates a radial space between the inlet and outlet pushrods 80, 82 thus the respective inlet and outlet valves 76, 78 of the propane flow circuit 74 remain spring-biased closed as previously described (see FIG. 9). Moreover, because the engine is not yet started, the fuel metering apparatus 32, located between the intake manifold 42 and the outlet passage 120, remains closed and butane does not yet flow through the fuel control device 20 (see FIG. 1).

Starting of the engine with butane gas is similar to starting the engine with propane gas, and operation of the fuel metering device 32 is generally the same. However, the inlet passage 46 is preferably fitted with the butane pressure regulator 54 so that when the butane fuel is gradually consumed from the butane cylinder 24 the decrease in butane pressure in the commonly marketed and relatively small cylinder is not transmitted through the fuel metering apparatus 32. Instead, the pressure regulator 32 supplies fuel at a relatively consistent pressure regardless of any considerable pressure decrease in the cylinder 24. The butane gas preferably is further pressure regulated by the butane jet 95 before it is supplied to the carburetor mixing passage 202.

When the operator shuts down the engine and the intake vacuum pressure decreases with the sudden decrease in engine speed or power, the resilient biasing force of springs 172 and 196 acting upon the large-diameter diaphragm 190 of the shutoff valve actuator 182 overcomes the force produced by vacuum pressure in the pressure chamber 188 and the shutoff valve 154 closes. With shutoff valve 154 closed, the supply of gaseous fuel flowing to the engine is stopped.

While the forms of the invention herein disclosed constitute presently preferred embodiments, many others are possible. For instance, the fuel selection module 26 and fuel flow circuits 72, 74 can be replaced with solenoid valves requiring an electric power and an electric/electronic control unit. Furthermore, if the fuel is stored in gaseous form air can be premixed with the fuel thus alleviating the need for a conventional carburetor. It is not intended herein to mention all the possible equivalent forms, modifications or ramifications of the invention. It is understood that terms used herein are merely descriptive, rather than limiting, and that various changes may be made without departing from the spirit or scope of the invention as defined by the following claims.

We claim:

1. A gaseous fuel control device for a combustion engine with a carburetor having an air and gas fuel mixing passage with a throttle valve movable between idle and wide open positions, comprising:
    a body;
    a plurality of fuel inlet passages in the body, wherein each one of the plurality of fuel inlet passages communicates with a supply of a respective one of a plurality of gaseous fuel types;
    a fuel outlet passage in the body communicating with the mixing passage to supply any selected one of the plurality of gaseous fuel types to the mixing passage for mixing with air to supply the mixture of air and gaseous fuel to the engine;
    a gaseous fuel metering assembly having a fuel chamber, a metering diaphragm communicating with the fuel chamber, and a metering valve movable by actuation of the metering diaphragm between open and closed positions and having an outlet communicating with the fuel chamber and an inlet which receives gaseous fuel from a selected one of the plurality of fuel inlet passages when the engine is operating; and
    a separate restricted orifice for each of the gaseous fuel types which when the engine is operating selectively communicates the fuel metering chamber with the mixing passage upstream of the throttle valve to both supply the selected gaseous fuel from the metering chamber through the restricted orifice to the mixing passage and to actuate the metering diaphragm to move the metering valve between its open and closed positions to vary the flow rate of the selected gaseous fuel into the mixing passage in proportion to the rate of air flow through the mixing passage when the engine is operating with the throttle valve movable between its idle and wide open positions.

2. The fuel control device set forth in claim 1 wherein each restricted orifice has an inner diameter corresponding to a respective one of the plurality of fuel types.

3. The fuel control device set forth in claim 1 which also comprises a fuel shutoff valve carried by the body and disposed in communication with the manifold outlet to selectively prevent fuel flow to the fuel outlet passage.

4. The fuel control device set forth in claim 3 wherein the fuel metering valve is disposed between the shutoff valve and each restricted orifice.

5. The fuel control device set forth in claim 3 wherein the shutoff valve is yieldably biased to its closed position and is associated with another diaphragm to open the shut off valve in response to a sufficient differential pressure across the another diaphragm which displaces a portion of the another diaphragm and opens the shut off valve.

6. The fuel control device set forth in claim 5 wherein the fuel metering valve is biased closed and the metering diaphragm on one side defines part of a metering chamber and on the other side part of a reference chamber and is flexed in response to a sufficient pressure signal in the metering chamber to open the fuel metering valve.

7. The fuel control device set forth in claim 1 wherein all of fuel types are in a gaseous state.

8. The fuel control device set forth in claim 1 further comprising a plurality of inlet valves, each associated with a respective one of the plurality of inlet passages and selectively opened by a fuel selector so that no more than one valve of the plurality of inlet valves is open at any given time.

9. The fuel control device set forth in claim 8 further comprising a plurality of outlet valves each associated with the outlet passage and a respective one of the plurality of restricted orifices.

10. The fuel control device set forth in claim 9 wherein the fuel selector includes a camshaft carried by the body and having a plurality of cams with each one of the plurality of cams being associated with a respective one of the plurality of inlet valves or a respective one of the plurality of outlet valves so that movement of the camshaft moves the cams to selectively open an inlet valve and an outlet valve associated with one of the plurality of fuel types.

11. The fuel control device set forth in claim 7 wherein the plurality of fuel types includes a propane fuel in a gaseous state and a butane fuel in a gaseous state.

12. The fuel control device set forth in claim 6 wherein the fuel chamber communicates with a venturi region of the mixing passage of the carburetor so that the pressure in the venturi region is communicated with the metering diaphragm.

13. The fuel control device set forth in claim 12 wherein the another diaphragm associated with the shutoff valve communicates with the mixing passage so that the another diaphragm is responsive to the pressure in at least part of the mixing passage.

14. The fuel control device of claim 1 which also comprises:
    an inlet channel in the body;
    a mid channel in the body;
    a shutoff valve movable between open and closed positions to selectively communicate the inlet channel with the mid channel when the shutoff valve is open to permit fuel flow from the inlet channel to the mid channel, the shutoff valve is closed when the engine is not operating and is responsive to a vacuum pressure generated while the engine is operating to open the shutoff valve; and the metering valve is movable between open and closed positions to selectively communicate the mid channel with the outlet passage and the metering diaphragm is constructed and arranged to open the metering valve in response to changes in pressure downstream of the metering valve to selectively open the metering valve as a function of the forces acting on the metering diaphragm.

15. The fuel control device set forth in claim 14 wherein the metering diaphragm communicates downstream with the outlet passage and upstream with the mid channel when the metering valve is open, and wherein a negative pressure communicated to the metering chamber through the outlet passage causes the metering diaphragm to flex and thereby open the metering valve.

16. The fuel control device set forth in claim 15 wherein the metering valve is located in the metering chamber and is selectively engaged by the metering diaphragm to open the metering valve.

17. The fuel control device set forth in claim 14 wherein the shutoff valve is a poppet-type valve having a valve head that opens in a linear direction.

18. The fuel control device set forth in claim 17 wherein the shutoff valve moves from its closed position to its open position against the direction of gaseous flow through the shutoff valve.

19. The fuel control device set forth in claim 17 further comprising a shutoff valve actuator that has a first diaphragm defining in-part a vacuum chamber and a drive member engageable with the first diaphragm at one end, and extending through the vacuum chamber toward the shutoff valve along the direction of movement of the valve head.

20. The fuel control device set forth in claim 19 wherein the shutoff valve actuator has a second diaphragm that is adjacent to and operably associated with an end of the drive member opposite to said one end, defines a displacement chamber on one side through which the drive member projects, and defines a valve chamber on an opposite side through which the gaseous fuel flows when the shutoff valve is open.

21. The fuel control device set forth in claim 20 wherein the second diaphragm flexes in unison with the vacuum diaphragm to drive the shutoff valve for linear movement between its open and closed positions.

22. The fuel control device set forth in claim 1 further comprising:

an inlet channel communicating with and orientated downstream of one of the inlet passages;

a biased closed inlet valve orientated between the inlet passage and the inlet channel, and constructed and arranged to be selectively opened by an operator;

a biased closed shutoff valve orientated between the outlet passage and the inlet channel for automatically isolating the outlet passage from fuel flow when the engine is not running and wherein opening and closing movement of the shutoff valve is along a linear centerline; and a shutoff valve actuator having a first diaphragm defining in-part a vacuum chamber and a drive member driven for movement by the first diaphragm and extending along the centerline to move the shutoff valve to its open position upon existence of a sufficient vacuum pressure in the vacuum chamber which flexes the diaphragm, moves the drive member, and opens the shutoff valve.

23. The fuel control device set forth in claim 22 further comprising a second diaphragm engaged to the drive member and defining in-part a valve chamber on one side that communicates between the inlet channel and the outlet passage, and defining part of the vacuum chamber on an opposite side.

24. The fuel control device set forth in claim 23 further comprising a restricted orifice orientated between the valve chamber and the outlet passage to control gaseous fuel flow downstream of the restricted orifice.

25. The fuel control device set forth in claim 24 wherein the fuel metering valve is disposed between the restricted orifice and the valve chamber to control the gaseous fuel flow to the combustion engine as a function of a sensed pressure derived from the running engine.

\* \* \* \* \*